Figure 1:
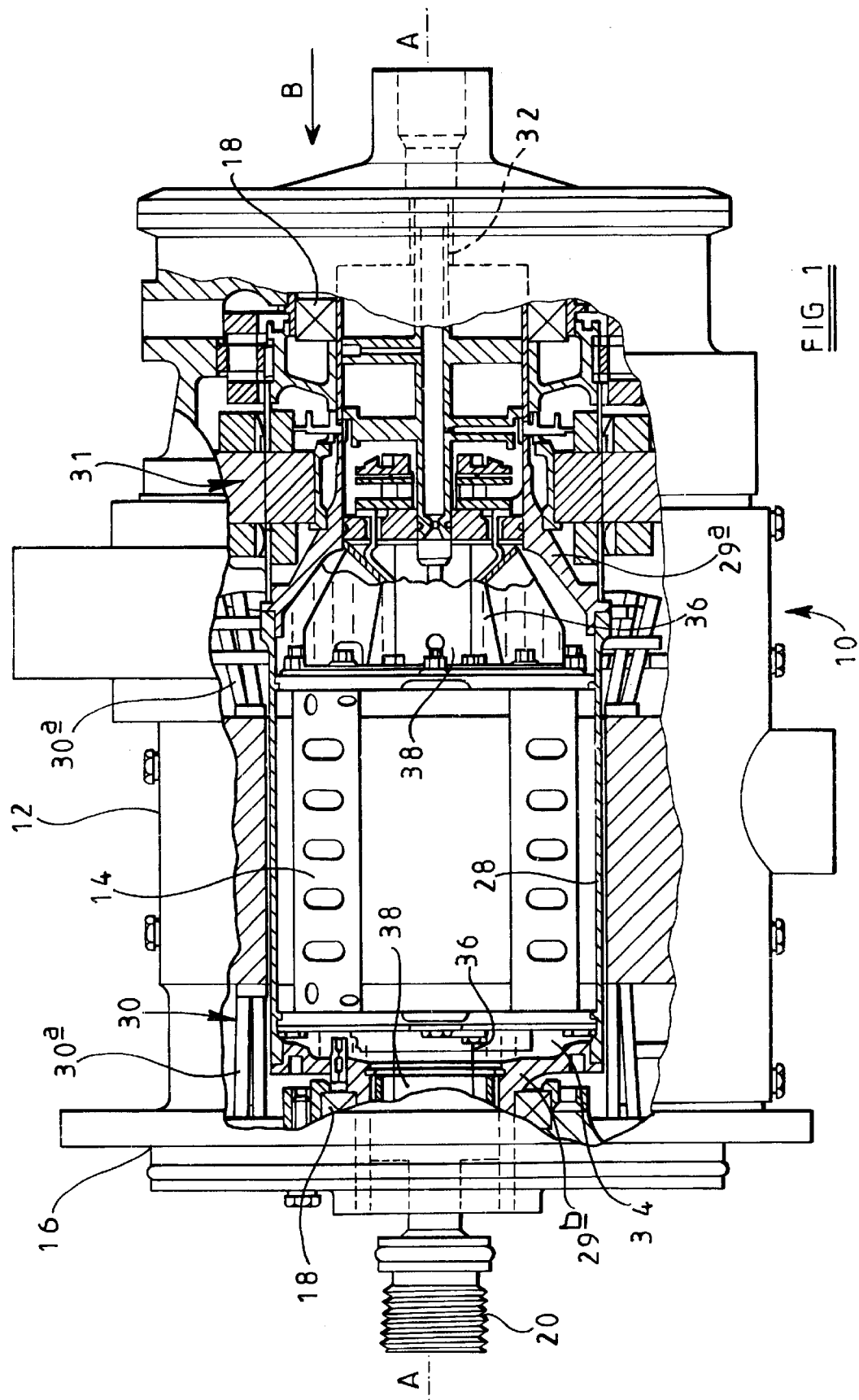

United States Patent [19]
Cooper

[11] Patent Number: 6,107,709
[45] Date of Patent: Aug. 22, 2000

[54] ROTARY ELECTRIC MACHINE

[75] Inventor: John Cooper, Herts, United Kingdom

[73] Assignee: Lucas Industries, London, United Kingdom

[21] Appl. No.: 09/262,978

[22] Filed: Mar. 4, 1999

[30] Foreign Application Priority Data

Mar. 7, 1998 [GB] United Kingdom .................. 9804869

[51] Int. Cl.⁷ ................................ H02K 9/19; H02K 1/32
[52] U.S. Cl. ............................. 310/61; 310/60 R; 310/58
[58] Field of Search ...................................... 310/58, 60 R, 310/61, 62, 60 A

[56] References Cited

U.S. PATENT DOCUMENTS

| | | | |
|---|---|---|---|
| 4,203,044 | 5/1980 | Linscott, Jr. ................................ | 310/61 |
| 5,160,864 | 11/1992 | Saito ............................................ | 310/54 |
| 5,554,898 | 9/1996 | Howard et al. ............................. | 310/61 |

*Primary Examiner*—Nestor Ramirez
*Assistant Examiner*—Judson H. Jones
*Attorney, Agent, or Firm*—Wells, St. John, Roberts, Gregory & Matkin, P.S.

[57] ABSTRACT

A variable speed rotary electric machine comprises a stator having windings and a rotor having windings mounted within the stator for rotation about an axis; a cooling fluid inlet into a first end region of the rotor; at least one first fluid duct having an inlet orifice in the first end region of the rotor and an outlet orifice arranged to discharge fluid onto a first region of the stator windings; and at least one second fluid duct having an inlet orifice in an opposite end region of the rotor and an outlet orifice arranged to discharge fluid onto a second region of the stator windings. A flow path extends through the rotor from the first end region to the opposite end region, the rotor windings being in the flow path. The machine also comprises at least one third fluid duct having an inlet orifice in said opposite end region of the rotor and an outlet orifice. The at least one third duct has a greater flow capacity than the at least one second duct and the inlet orifice of the third duct is located closer to the axis of the rotor than the inlet orifice of the second duct.

7 Claims, 3 Drawing Sheets

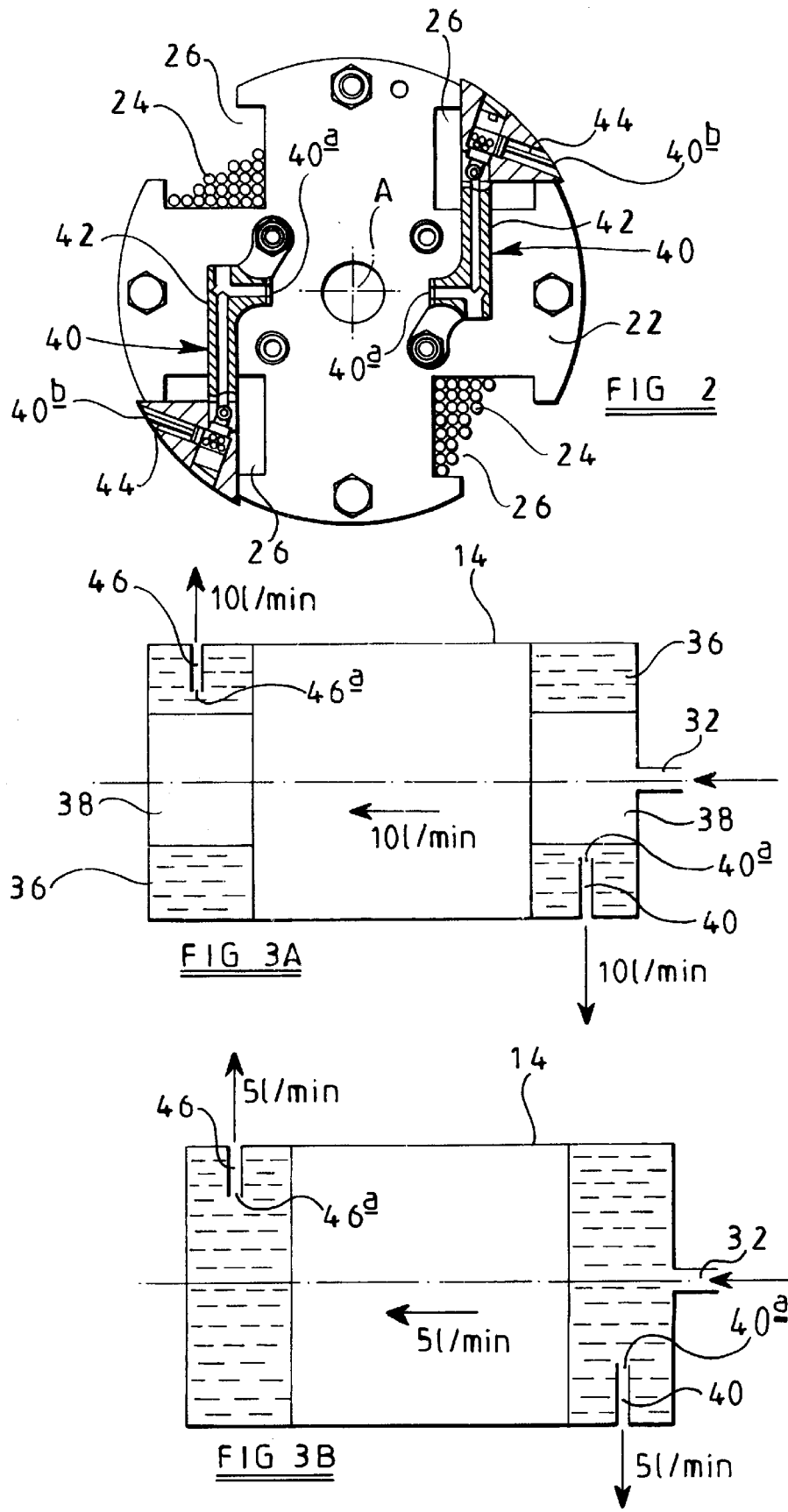

ROTARY ELECTRIC MACHINE

The present invention relates to rotary electric machines, more particularly to rotary electric machines which operate at varying rotational speeds, such as a variable frequency generator.

In a rotary electric machine having an enclosed rotor and a stator, such as a variable frequency generator, it is usually necessary to provide cooling to both the stator windings and the rotor windings. This can be achieved by passing cooling fluid (eg. oil) into the rotor and through the rotor windings, and simultaneously jetting oil from outlets at either end of the rotor onto the stator end windings. A particular problem with electric machines which operate at varying rotational speeds is that a sufficient cooling fluid flow rate must be maintained at low operating speeds to avoid overheating of the windings, whereas at high operating speeds, care must be taken to avoid an excessive flow rate which may damage the coating of the stator end windings and/or impair the efficiency of the machine.

In WO 91/07003, the stator end windings of a variable speed generator are cooled by means of a cooling fluid fed centrifugally through a radial tube having an orifice through which the fluid sprays onto the end windings. Means for varying the size of the orifice in the form of a ball and a biasing spring which acts upon the ball are provided to limit the flow of cooling fluid at high speeds.

In U.S. Pat. No. 5,554,898, a simpler arrangement is described. Ducts leading from the interior of the rotor to its periphery are provided at opposite ends of the rotor with a flow path therebetween which passes over the rotor windings. In use, cooling oil is pumped into the rotor and along the flow path over the rotor windings. Centrifugal force causes the cooling oil to form an annular layer at each end of the rotor. The inlets of the ducts are submerged in the annular oil layer and so oil is forced through the ducts onto the stator end windings. At increasing rotational speeds, the height of the annular layer ("head") above the inlets is reduced, thereby helping to maintain a reasonably steady flow of cooling fluid to the stator end windings.

In both WO 91/07003 and U.S. Pat. No. 5,554,898, the primary problem addressed is prevention of damage to the stator end windings by excessive flow of cooling fluid at high rotational speeds. However, a significant problem for certain applications is to maintain sufficient cooling fluid flow over the rotor windings to prevent the rotor windings overheating when demand is high at low rotational speeds.

Thus, an object of the present invention is to provide a rotary electric machine in which a sufficient flow of cooling fluid is maintained over the rotor windings at low rotational speeds, whereas excessive flow is avoided at high rotational speeds.

According to the present invention, there is provided a variable speed rotary electric machine comprising a stator having windings and a rotor mounted within the stator for rotation about an axis, said rotor having windings; a cooling fluid inlet into a first end region of the rotor; at least one first fluid duct having an inlet orifice in the first end region of the rotor and an outlet orifice arranged to discharge fluid onto a first region of the stator windings; at least one second fluid duct having an inlet orifice in an opposite end region of the rotor and an outlet orifice arranged to discharge fluid onto a second region of the stator windings; and a flow path extending through the rotor from the first end region to the opposite end region, the rotor windings being in the flow path; wherein at least one third fluid duct having an inlet orifice in said opposite end region of the rotor and an outlet orifice is provided, said at least one third duct having a greater flow capacity than said at least one second duct and the inlet orifice of which is located closer to the axis of the rotor than the inlet orifice of the second duct.

It will be understood that in use, when an annular layer of cooling fluid is formed in each end region of the rotating rotor due to centrifugal force, the inlet orifices of all the ducts are located within the annular layer of cooling fluid at relatively low rotational speeds, whereas only the inlet orifices of the first and second ducts are located within the annular layer of cooling fluid at relatively high rotational speeds.

Preferably, said at least one third duct has at least double the flow capacity of said at least one second duct.

The greater flow capacity of said at least one third duct can be conveniently achieved by forming such duct with a bore which is greater than that of the second duct.

Preferably, the inlet orifice of the first duct is located closer to the axis than the inlet orifice of the second duct.

Preferably, a pair of each of the first, second and third ducts are provided. More preferably, the outlet orifices of each pair of ducts are diametrically opposed.

Preferably, the rotary electric machine is a variable frequency generator and is more preferably of the general type described in U.S. Pat. No. 5,554,898.

Figure 4A:
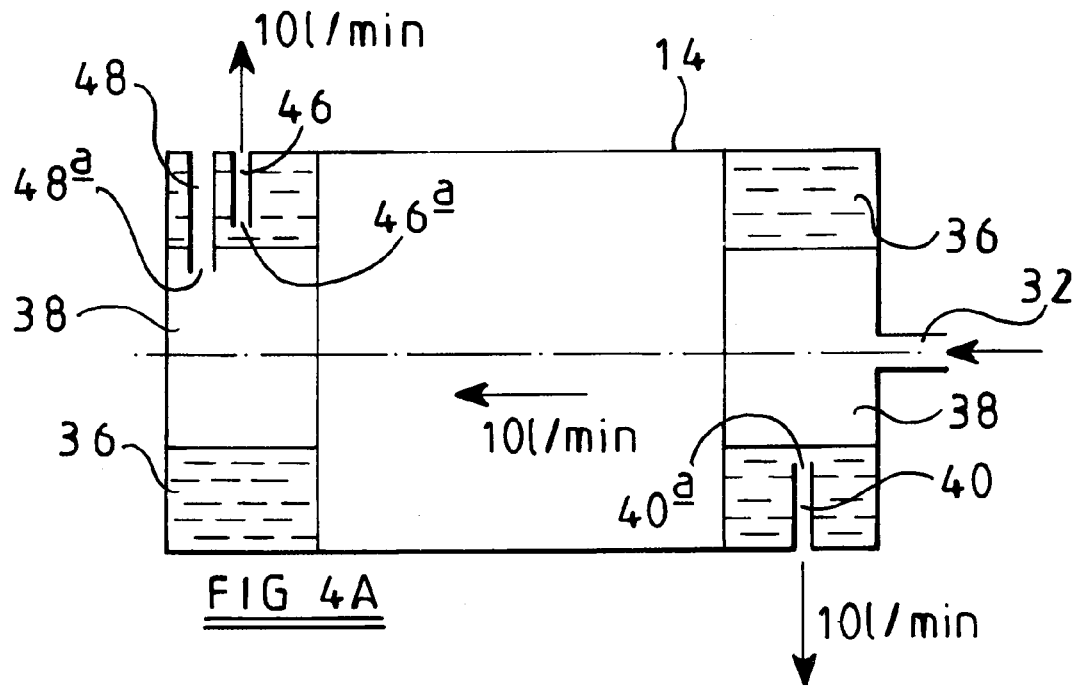
Figure 4B:
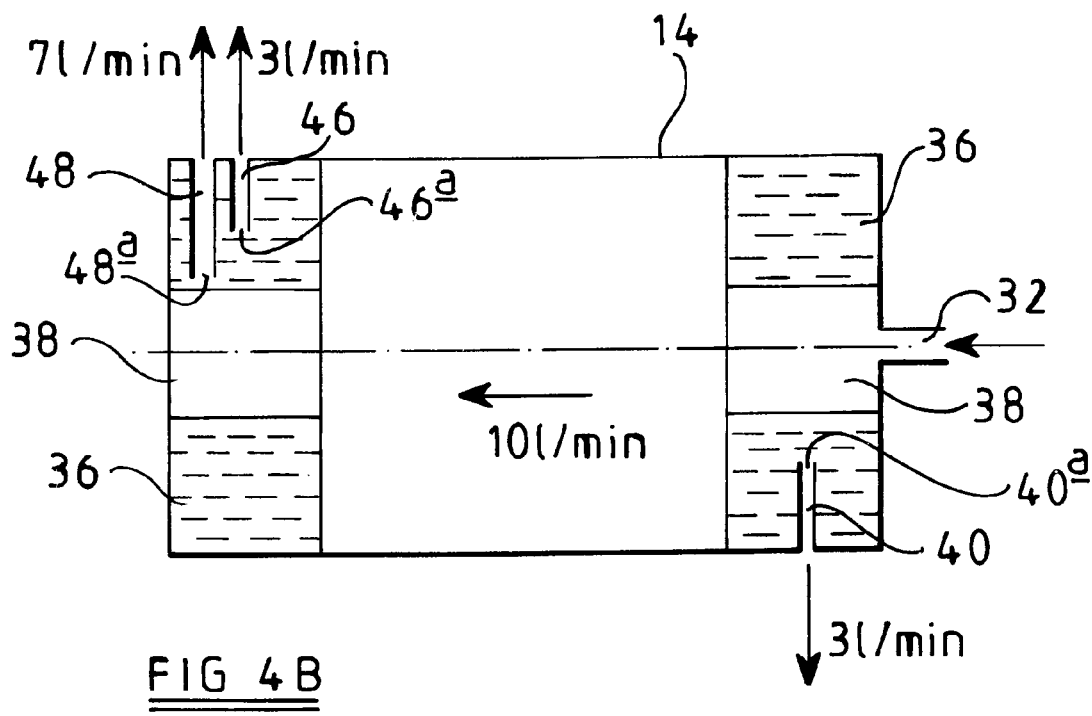

An embodiment of the invention will now be described by way of example, with reference to the accompanying drawings in which:

FIG. 1 is a cross section of a known type of variable frequency (VF) generator disclosed in U.S. Pat. No. 5,554,898, FIG. 2 is an end view of the rotor of the generator of FIG. 1 in the direction of arrow B in FIG. 1, showing fluid ducts in cross section and to a larger scale, FIGS. 3A and 3B show diagrammatically part of the generator of FIG. 1, operating at high and low speeds respectively, and FIGS. 4A and 4B show diagrammatically part of an embodiment of a generator in accordance with the present invention, operating at high and low speeds respectively.

Similar parts will be accorded the same reference numerals throughout the description.

FIG. 1 shows a VF generator 10 which is as disclosed in U.S. Pat. No. 5,554,898 and to which specification reference should be made for a more detailed description. Briefly, the generator 10 comprises a stator 12 and rotor 14 contained in a housing 16. The rotor 14 is mounted within the stator 12 on bearings 18 for rotation about its axis A. The rotor 14 is driven through the intermediary of a splined hollow shaft 20. The rotor 14 has a core 22 with windings 24 extending axially along recesses 26 therein (see FIG. 2) and the periphery of the core 22 is surrounded by a sheet metal tube 28. End covers 29a and 29b are provided at opposite ends of the tube 28. The stator 12 has windings 30 which extend beyond the body of the stator 12 at both ends to form overhanging end windings 30a. Current is supplied to the rotor windings 24 via an exciter generator 31 and the main generator output power is generated in the stator windings 30 in response to the rotating magnetic field produced by the rotor 14.

Cooling oil is supplied to a first end region of the rotor 14 by an inlet tube 32 and passes along a flow path between the rotor windings 24 to emerge into a chamber 34 at an opposite end region of the rotor 14. In use, rotation of the rotor 14 causes the cooling oil to be forced outwardly so as to form an annular layer 36 surrounding a central air core 38 at both end regions of the rotor 14. Each layer 36 is established on the sheet metal tube 28 and end covers 29a and 29b.

Referring to FIG. 2, a pair of first ducts 40, each having an inlet orifice 40a defined by one end of a fluid feed member 42 (of similar construction to those disclosed in U.S. Pat No. 5,554,898), an outlet orifice 40b and a jet 44, are provided at said first end region of the rotor 14. The inlet orifices 40a are submerged in the annular oil layer 36 such that cooling oil is fed from the annular layer 36 to the periphery of the rotor 14 where it is sprayed onto the stator end windings 30a. A similar arrangement of second ducts (not shown) is provided at the opposite end region of the rotor, the primary difference being that the inlet orifices 40a of the ducts 40 are closer to the axis of the rotor 14 than the inlet orifices of the second ducts, to allow for the pressure drop across the rotor 14.

FIGS. 3A and 3B show diagrammatically part of a conventional generator 10 having a pair of first and second ducts 40,46 (only one of each pair shown) at each end region of the rotor 14. In FIG. 3A the rotor speed is high (eg. 15,000 rpm). An annular layer of cooling oil 36 having a central air core 38 is formed in the region of the first duct 40 due to the centrifugal force generated by rotation of the rotor 14. The cooling oil passes over the rotor windings 24 at a rate of approximately 10 l/min to the region of the second duct 46 where it reforms into an annular layer 36. The radial positioning of the first and second duct inlet orifices 40a and 46a is such that cooling oil is drawn into the first and second ducts 40 and 46 and is subsequently sprayed onto the stator end windings 30a at a rate of 10 l/min from each first and second duct 40 and 46.

In FIG. 3B, the rotor speed is low (10,000 rpm). The flow of cooling fluid across the rotor 14 and through the first and second ducts 40 and 46 is reduced to 5 l/min and is not sufficient at this speed to generate an annular oil layer. Such a flow rate may be insufficient to cool the rotor windings 24 in high demand situations.

The generator shown diagrammatically in FIGS. 4A and 4B is similar to that of FIGS. 3A and 3B, but is provided with a third duct 48 at the same end region as the second ducts 46 in accordance with the present invention (only one shown). The third duct 48 is of similar construction to the first and second ducts 40,46 but has a wider bore to give it a larger flow capacity.

Referring to FIG. 4A, when the rotor speed is high the inlet orifice 48a of the third duct 48 lies in the air core 38 and therefore no cooling oil is drawn into the inlet orifice 48a. At this speed there is no difference in operation between the generators of FIGS. 3A and 4A.

Referring to FIG. 4B, it can be seen that, at low rotor speeds, the inlet orifice 48a of the third duct 48 now lies within the annular oil layer 36 and therefore oil is drawn through the second and third ducts 46 and 48 at rates of 3 l/min and 7 l/min respectively, due to the relative sizes of the bores of the second and third ducts 46 and 48. In this case, the flow across the rotor windings 24 is maintained at 10 l/min. As the rotor 14 increases in speed, the air core 38 expands radially from the position shown in FIG. 4A to the position shown in FIG. 4B. The inlet orifice 48a of the third duct 48 is positioned so that when it is no longer submerged in the oil layer 36, a sufficient flow across the rotor 14 is maintained by the second duct 46 alone.

In the conventional generator, flow across the rotor windings 24 at slow speeds could be increased to a satisfactory level by increasing the bore of the second duct 46. However, this would result in excessive flow through the rotor windings 24 at higher speeds, impairing the efficiency of the generator and risking damage to the stator end windings 30a (FIG. 1).

I claim:

1. A variable speed rotary electric machine comprising a stator having windings and a rotor mounted within the stator for rotation about an axis, said rotor having windings; a cooling fluid inlet into a first end region of the rotor; at least one first fluid duct having an inlet orifice in the first end region of the rotor and an outlet orifice arranged to discharge fluid onto a first region of the stator windings; at least one second fluid duct having an inlet orifice in an opposite end region of the rotor and an outlet orifice arranged to discharge fluid onto a second region of the stator windings; and a flow path extending through the rotor from the first end region to the opposite end region, the rotor windings being in the flow path; wherein at least one third fluid duct having an inlet orifice in said opposite end region of the rotor and an outlet orifice is provided, said at least one third duct having a greater flow capacity than said at least one second duct and the inlet orifice of which is located closer to the axis of the rotor than the inlet orifice of the second duct.

2. A machine in accordance with claim 1, wherein said at least one third duct has at least double the flow capacity of said at least one second duct.

3. A machine in accordance with claim 1, wherein said at least one third duct is formed with a bore which is greater than that of the second duct.

4. A machine in accordance with claim 1, wherein the inlet orifice of the first duct is located closer to the axis than the inlet orifice of the second duct.

5. A machine in accordance with claim 1, wherein a pair of each of the first, second and third ducts are provided.

6. A machine in accordance with claim 5, wherein the outlet orifices of each pair of ducts are diametrically opposed.

7. A machine in accordance with claim 1, wherein the machine is a variable frequency generator.

* * * * *